Oct. 6, 1970 J. C. EWIN 3,532,827

SCANNER ARRANGEMENT FOR IDENTIFYING CIRCUITS CHANGING THEIR STATES, STORING THE TIMES OF SUCH CHANGE, AND DETERMINING THE CHARACTER OF THE CHANGE IN A COMMUNICATION SWITCHING SYSTEM

INVENTOR
J. C. EWIN
BY Howard R. Popper
ATTORNEY 3,532,827

SCANNER ARRANGEMENT FOR IDENTIFYING CIRCUITS CHANGING THEIR STATES, STORING THE TIMES OF SUCH CHANGE, AND DETERMINING THE CHARACTER OF THE CHANGE IN A COMMUNICATION SWITCHING SYSTEM

James C. Ewin, Holmdel, N.J., assignor to Bell Telephone Laboratories, Incorporated, Murray Hill, N.J., a corporation of New York Filed Oct. 19, 1967, Ser. No. 676,407
Int. Cl. H04q *3/18, 3/54*
U.S. Cl. 179—18 11 Claims

ABSTRACT OF THE DISCLOSURE

An input-output arrangement for a program-controlled communication switching system is disclosed in which each scan point is provided with a memory element to indicate scan point changes of state. The identities of scan points exhibiting a change of state are entered into a buffer register together with the time at which the change of state occurred. The central processor empties the buffer register and computes from the different time entries pertaining to a given scan point the character of the change which occurred thereat. Scanning technique is improved without an increase in central processor time.

BACKGROUND OF THE INVENTION

Figure 1:
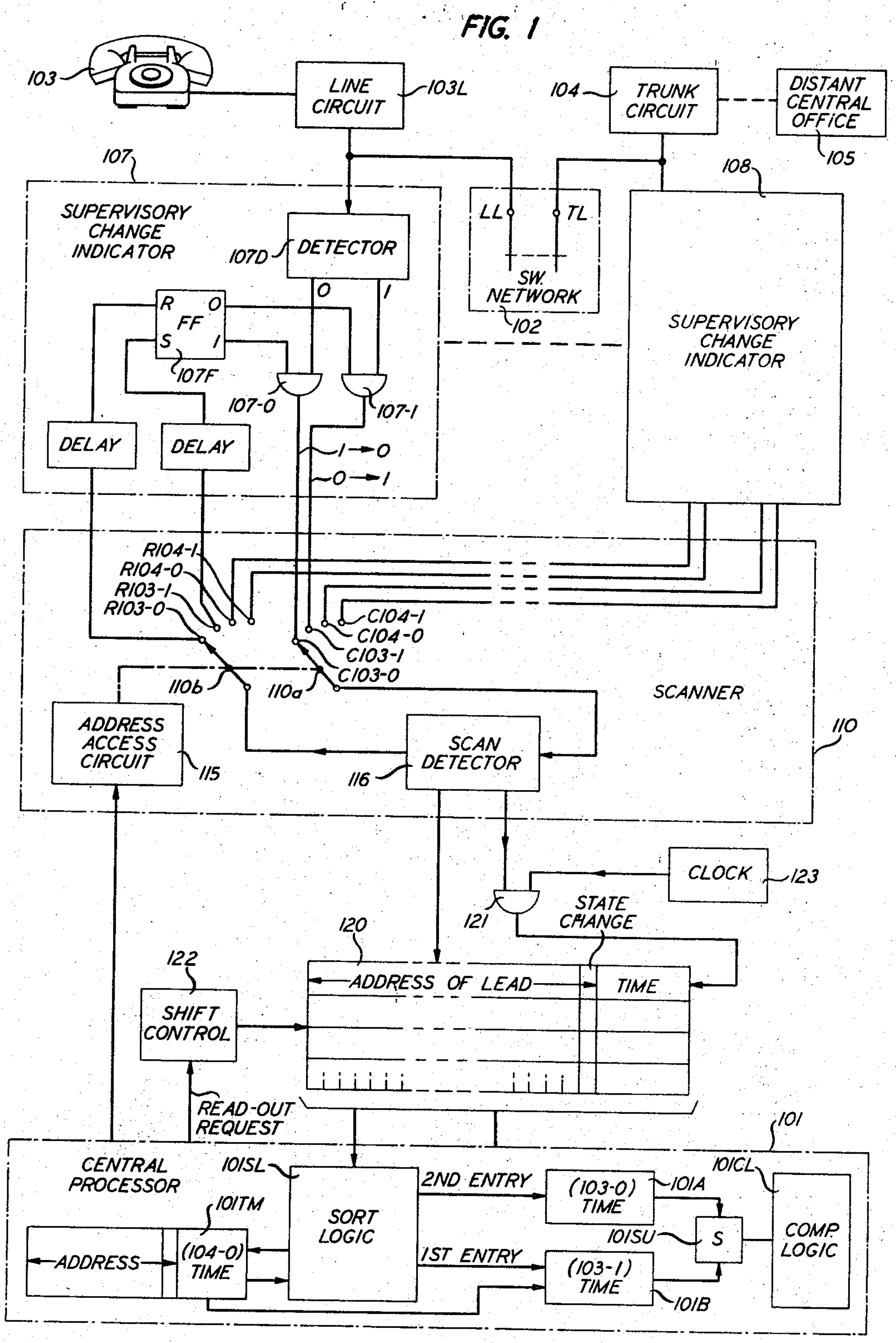

The present invention relates to input-output arrangements for program controlled communication switching systems and, more particularly, to arrangements for determining the character of changes occurring at the input points which present information to such systems.

In prior communication switching systems employing electronic scanning, various scanning tasks are performed. When a line is placed in the off-hook state to request service, this condition must be detected and the central processor given information as to the identity of the service requesting line. This scanning task is called line service request scanning. When the line is in the process of transmitting call signaling information, in the form of dial pulses for example, a dial pulse receiver is scanned to furnish the central processor the called number. Likewise, trunk circuits are scanned to ascertain the supervisory state. Each of these scanning tasks involves its own peculiar problems and imposes its own special demands on processor time. It was initially found to be satisfactory to scan lines for service requests every 100 milliseconds and to scan the digit receivers for dial pulses every 10 milliseconds. The supervisory leads of trunks were scanned every 100 milliseconds. However, as these experimental communication switching systems were operated under real traffic conditions, it became apparent that the central processor was called upon to spend too much of its time doing input-output tasks and therefore the rate of scanning for service requests had to be cut in half. Even so, the processor spent more than a desirable fraction of its total time doing input-output tasks. A further reduction in the rate of scanning for service requests is not desirable nor is it at all feasible to reduce the rate of scanning for dial pulses or for trunk supervisory changes. In fact, the present rate of scanning for trunk supervisory changes is already at an unsatisfactorily low rate. For example, difficulties will be encountered in toll switching applications where the so-called rering signal will be transmitted over a toll trunk. The rering signal is nominally of 100–130 milliseconds duration but, because of the distortions introduced by single frequency signaling links, the duration of the rering signal may be as little as 55 milliseconds. While the undistorted rering signal would probably be detected with a 100 millisecond scan, a slightly distorted rering signal could be completely overlooked. Even if an increase in the scanning rate could otherwise be tolerated by the central processor, an unexpected additional demand on processor time is generated by the need to discriminate against electrical disturbances (hits) which may have durations of 10–20 milliseconds. Accordingly, an improved scanning technique which does not increase central processor time is required. This is one of the objects of the present invention.

SUMMARY OF THE INVENTION

In accordance with the principles of the present invention, in one illustrative embodiment thereof, each scan point is provided with a change of state memory element, hereinafter called supervisory element for short. The supervisory elements are scanned and the identities of those indicating a change of state are entered into a buffer register. Advantageously, the scanning rate is sufficiently rapid so that no significant change of state will be missed. As each change of state is entered into the buffer register, the time of entry is recorded. The processor consults the buffer register as determined by processor work load rather than interrupting the processor on a periodic basis. However, if the processor does not empty the buffer frequently enough, the buffer may be equipped to generate an interrupt as it becomes full. When the processor empties the buffer, it reads the time entries for each scan point change and computes the character of the scan point changes from these time entries.

Accordingly, it is a feature of the present invention to ascertain the time at which a scan point change of state occurs and to enter that time together with the identity of the scan point into a buffer register so that the character of the scan point change may be ascertained by computation from the different times entered in the buffer for the same scan point.

The foregoing and other objects and features may become more apparent by referring now to the drawing, the single figure of which shows a scanner arrangement for a program controlled communication switching system according to the present invention.

GENERAL DESCRIPTION

The illustrative communication switching system, which advantageously may be of the type disclosed in the copending application of Doblmaier et al., Ser. No. 334,875, filed Dec. 31, 1963, comprises a central processor 101 for performing the computations required to control the functioning of switching network 102 in rendering telephone service to a plurality of telephone sets 103 and trunks 104. The status of the telephone sets and trunks is ascertained by means of a scanner which, in the prior art system, was caused to ascertain the on- and off-hook states of the lines every 100 milliseconds. Since the scanner as well as the switching network were under the control of processor 101, if the processor was engaged in executing some other instruction at the start of a 100 millisecond interval, it was necessary to interrupt the processor, store away in memory the contents of its various index registers as well as the location of the point at which the program being executed was interrupted and then transfer to the program for controlling the scanners. While this arrangement was at first thought to be satisfactory, it became evident after some experience with the processing of telephone calls under actual traffic conditions that the scanning of the lines and trunks occupied almost half of the available operating time of the central processor. In addition, the 100 millisecond scan interval was found not to be frequent enough to detect certain supervisory signal conditions on one of the trunks such as trunk 104. For example, when trunk 104 receives a rering signal from a distant office 105, the supervisory signal change may last as little as 55 milliseconds. A signal of this duration would only occassionally be detected by scanning which occurred only once every 100 milliseconds. The rate of scanning could not be increased, however, because then the processor would be spending too much of its time on the input-output phase of its work and not have enough time left to execute the instructions of the call processing programs.

In the drawing, scanner 110 operates independently of central processor 101 to the extent that it is adapted automatically and repetitively to cycle through all of the scan points without need of receiving specific instructions to do so from processor 101. While the scanner has been represented as having arms 110*a* and 110*b* which are the symbols normally employed to represent mechanical selector switches, it is to be understood that any convenient type of selector electromechanical or electronic, solid state or optical scanning device may be used. In addition it is known that such scanners under certain circumstances are desired to be directed to a particular scan point, perhaps out of the normal order of cycling through scan points and, for this purpose, an address access unit 115 under the control of central processor 101 is included in scanner 110.

Each circuit to be scanned is provided with a supervisory change indicator such as circuit 107 associated with line circuit 103L or indicator 108 associated with trunk circuit 104. The supervisory change indicator circuit 107 provides two scan point terminals C103–0, C103–1 accessible to scan arm 110*a*.

Scan point terminal C103–0 will be energized when line circuit 103L undergoes a change from the binary state representing "1" to the binary state representing "0". Scan point terminal C103–1 is energized when line circuit 103L undergoes a change from a binary state representing "0" to a binary state representing "1." When neither of these scan point terminals is energized there will have been no change in the binary state of line circuit 103L.

Scan point terminals C103–0, C103–1 are associated with the outputs of AND gates 107–0 and 107–1, respectively. Assuming that line circuit 103L is in the binary state representing the value "1" detector 107D will have its "1" output terminal energized. This output terminal is connected to the "1" of the two input terminals of AND gate 107–1.

Flip-flop circuit 107F has its "0" output connected to the other input of AND gate 107–1. Under these circumstances AND gate 107–1 will not energize its scan point terminal C103–1. Since AND gate 107–0 has only one of its inputs energized, it will not energize its scan point terminal C103–0 either. However, if line circuit 103L should undergo a change from the "1" to the "0" state the "0" output terminal of detector 107D will become energized.

At this time, both of the inputs of AND gate 107–0 will be energized and AND gate 107–0 will energize its terminal C103–0. The energization of terminal C103–0 will be detected by scan detector 116 when arm 110*a* comes into contact with scan point terminal C103–0. Scan detector 116 thereupon enters the address of terminal C103–0 into shift register 120. Simultaneously therewith scan detector 116 enables AND gate 121 so that the time then indicated by clock 123 is entered into the same word of register 120. Scan detector 116 thereupon energizes arm 110*b*. Arms 110*a* and 110*b* are operated in synchronism so that when arm 110*a* is in contact with scan point terminal C103–0 arm 110*b* will be in contact with reset terminal R103–0. The energization of reset terminal R103–0 by arm 110*b* results in the resetting of flip-flop 107F. As is well known in the art, a delay unit may be inserted in series with the reset input of flip-flop 107F so that it will not be reset before its then existing output state has persisted for a sufficient interval to be detected by the associated circuits.

Thus, after scan detector 116 has responded to the energization of scan point terminal C103–0 the resetting of flip-flop 107F results in the de-energization of AND gate 107–0. AND gate 107–1 is not activated by the "0" output of flip-flop 107F inasmuch as detector 107D is still assumed to be indicating the "0" state of line circuit 103L.

If now the state of line circuit 103L should undergo a further change, that is, from the "0" state back to the "1" state, detector 107D will immediately re-activate its "1" output terminal. Since the "0" output terminal of flip-flop 107F is still activated AND gate 107–1 will now have both of its inputs energized and it in turn will energize scan point terminal C103–1.

Scan detector 116 will thereupon enter into shift register 120 the address of scan point terminal C103–1 and the time then indicated by clock 123 will be entered into the same word. Advantageously the addresses assigned to scan point terminals C103–0 and C103–1 are adjacent numbers in a binary coded format.

Accordingly, the right-most or least significant bit of this address when entered into register 120 will indicate the change of state detected by scan detector 116.

Whenever the change of state is from a binary "1" state to the binary "0" state, the least significant bit of the address recorded in register 120 will be a "0" because the least significant bit of the address of scan point terminal C103–0 is a "0." Likewise when the binary state of line circuit 103L undergoes a change from the binary "0" state to the binary "1" state, the least significant bit of the address then entered into the register 120 will be a "1" because the least significant bit of the address assigned to the scan point terminal C103–1 is a "1."

In this manner, shift register 120 will have a plurality of words entered therein, each word consisting of the address of a scan point and the time at which the scan point address was entered into the register. Each scan point address in the register indicates a specific change of state for its associated circuit 103L, 104L, etc., as the case may be.

Since scanner 110 operates independently of processor 101, sufficient word capacity must be provided in register 120 for it to accommodate the maximum number of changes of state normally to be expected among the lines and trunks which are scanned between the times central processor 101 empties register 120 of its contents. Processor 101 obtains access to the contents of register 120 by selectively transmitting read-out requests to shift control circuit 122.

Processor 101 includes sort logic circuit 101SL which scans the address portions of the words obtained from register 120 to detect different entries having identical address bits except, of course, for the state change bit. Sort logic circuit 101SL may be implemented by conventional special purpose logic or by conventional general purpose logic controlled by stored program instructions. Numerous sorting and collating routines are known to those skilled in the programming arts by means of which items of data may be arranged into different orders according to any criteria of classification. Accordingly, the details of such conventional special purpose logic or conventional general purpose logic controlled by known sorting instructions will not be given herein.

Assuming logic circuit 101SL to have found two entries having identical address bits as just mentioned, it then enters the entry having the most recent (i.e., numerically greater) time in temporary register 101A and the entry having the earlier time in temporary register 101B. The entry in register 101B will be subtracted from the entry in 101A by subtract logic circuit 101SU and entered into the remaining logic circuits (not shown) of central processor 101 from which the processor may compute in accordance with conventional computing practices the character of the state change. Thus, if a state change occurs from the "0" state to the "1" state and returns to the "0" state within 50 milliseconds the processor will receive this information despite the fact that it has not been necessary for the processor to transmit read-out requests to the register or to transmit scan request orders to the scanner at anything like a 50 millisecond repetition rate.

It had heretofore been assumed in the above description that sort logic circuit 101SL had found two entries in register 120 having identical address bits. It may, however, happen that at the time the contents of register 120 are transferred to processor 101 a second change of state will not yet have occurred for some circuit, such as trunk circuit 104 whose address and time information had been entered into register 120 in connection with scanner 110 detecting a first state change thereat. Under such circumstances, sort logic circuit 101SL enters such single entry information, for example, that which had been indicated by an energized scan point terminal C104–0 into temporary memory 101TM. The next time that processor 101 transmits a read-out request to shift control 120 to obtain the new contents of register 120, sort logic circuit 101SL will, in sorting the addresses of entries obtained therefrom, also take into consideration the address stored in temporary memory 101TM in the same manner as if the contents of memory 101TM had been included as one of the entries directly provided by register 120. Under these circumstances, of course, the time bits 104–0 would be entered as a "1st Entry" into temporary register 101B and the time bits for the same address directly obtained from register 120 (for scan point terminal C104–1) would be entered into temporary register 101A.

The character of the scan point entries is easily ascertained from the output of subtractor unit 101SU by comparator logic 101CL. Comparator logic 101CL may be implemented in any well-known fashion and advantageously may comprise program controlled logic for comparing any of the values obtained from subtractor 101SU with values stored in central processor memory according to Table I below. Alternately, as is equally well known, comparator 101CL may employ special purpose logic for performing such comparisons. Table I illustrates the comparisons performed by comparator 101CL and is applicable to transitions from the off-hook to the on-hook and back to off-hook states, i.e., "1" to "0" to "1".

TABLE I

| Subtractor difference (milliseconds) | Character of state change |
|---|---|
| 0–20 | Hit on line, disregard. |
| 20–50 | Out of tolerance. Re-ring or/and hit, disregard or print trouble ticket (from trunk in answered state). |
| 55–130 | Re-ring signal (from trunk in answered state). |
| 25–70 | Dial pulse signal (from line in dialing state). |
| 250–750 | Switchhook flash. |
| 750 | Disconnect signal. |

From the above table it is apparent that the combination of supervisory change indicator circuits 107, 108, scanner 110, buffer register 120 and central processor 101 can be employed not only for supervisory signal detection, such as service requests from lines or trunks and re-ring signals from trunks, but also for actually "reading" call-signaling dial pulses. In addition, an initial single dial pulse can be distinguished from a hit on the line without need for employing special purpose hardware in a trunk circuit or register thereby further extending the utility of an initial dial pulse for signaling purposes beyond what heretofore has been considered to be practical.

The foregoing have been illustrative of the principles of the present invention; numerous other embodiments may be devised by those skilled in the art without departing therefrom.

What is claimed is:

1. In a program-controlled communication switching system having a plurality of circuits each being in one of a plurality of different states and a central processor, the improvement comprising buffer register means, time-indicating clock means, means for identifying each of said circuits exhibiting a change from one of said different states to another one thereof, means responsive to said identifying means for entering the identity of each change-of-state exhibiting circuit together with the time then indicated by said clock means into said buffer register means, and means in said central processor for computing the difference in times registered in said buffer register for a given circuit to ascertain the character of said circuit changes of state.

2. In a program-controlled communication switching system according to claim 1, the combination wherein said means for identifying said change-of-state exhibiting circuits comprises a pair of sequentially addressed scan points associated with each of said circuits, means for energizing one of said scan points of said pair when said circuit undergoes a change from a first to a second of said activity states, and means for energizing the other of said scan points of said pair when said circuit undergoes a change from said second to said first of said activity states.

3. In a program-controlled communication switching system according to claim 2, the combination wherein said means responsive to said identifying means comprises a scan detector for entering the address of an energized one of said sequentially-addressed scan points in said buffer register means.

4. In a program-controlled communication switching system according to claim 3, the combination wherein said means responsive to said identifying means includes gate means coupled to said clock and to said scan detector for entering said time indicated by said clock into said buffer register adjacent to said address of said energized scan point.

5. In a program-controlled communication switching system according to claim 2, the combination wherein the addresses of the addressed scan points are entered into said buffer register and wherein said central processor includes logic means for sorting the contents of said buffer means according to the address of the identified scan points entered therein.

6. In a program-controlled communication switching system according to claim 5, wherein said central processor comprises first and second temporary register means and subtract logic means coupled to said temporary register means, said sort logic means entering into said first temporary register means an entry corresponding to a first of a pair of said sequentially addressed scan points and entering into said second temporary register means an entry corresponding to the second of said pair of sequentially addressed scan points.

7. In a program-controlled communication switching system according to claim 1, the combination wherein said central processor includes temporary memory means for storing an entry when said buffer register contains only one entry pertaining to a change-of-state exhibiting scan point.

8. In a program-controlled communication switching system according to claim 7, the combination wherein said difference computing means in said processor computes the difference in times obtained from said entry in said temporary memory means and a corresponding time subsequently registered in said buffer register.

9. A communication switching system comprising a plurality of circuits each being in one of a plurality of different states, means for scanning said circuits to detect said states, clock means, and means responsive to said scanning means and said clock means for registering an identification of a circuit which has changed its state together with an indication of the time of said registering.

10. A communication switching system in accordance with claim 9 wherein successive changes of state of the same circuit are registered in said registering means and further including means for computing the difference in said registered times.

11. A communication switching system comprising a plurality of circuits each being in one of a plurality of different states, means for scanning said circuits to detect said states, time indicating clock means, and means responsive to said scanning means and said clock means for ascertaining the character of said circuit changes of state, said ascertaining means including means for registering a time for each said circuit change of state and means for computing the difference in times between two successive changes in state of the same circuit.

References Cited

UNITED STATES PATENTS 3,430,001 2/1969 Gianola et al.

WILLIAM C. COOPER, Primary Examiner

T. W. BROWN, Assistant Examiner

U.S. Cl. X.R.

179—18; 340—151

Disclaimer 3,532,827.—*James C. Ewin*, Holmdel, N.J. SCANNER ARRANGEMENT FOR IDENTIFYING CIRCUITS CHANGING THEIR STATES, STORING THE TIMES OF SUCH CHANGE, AND DETERMINING THE CHARACTER OF THE CHANGE IN A COMMUNICATION SWITCHING SYSTEM. Patent dated Oct. 6, 1970. Disclaimer filed Feb. 23, 1972, by the assignee, *Bell Telephone Laboratories, Incorporated.*

Hereby enters this disclaimer to claims 9 and 10 of said patent.

[*Official Gazette July 25, 1972.*]